US009920793B1

(12) United States Patent
Churchill et al.

(10) Patent No.: US 9,920,793 B1
(45) Date of Patent: *Mar. 20, 2018

(54) NEGATIVE STIFFNESS SYSTEM WITH VARIABLE PRELOAD ADJUSTMENT

(71) Applicant: HRL Laboratories, LLC, Malibu, CA (US)

(72) Inventors: Christopher B. Churchill, Ventura, CA (US); Guillermo A. Herrera, Winnetka, CA (US); Jacob J. Mikulsky, Santa Monica, CA (US); Geoffrey P. McKnight, Los Angeles, CA (US); Andrew C. Keefe, Encino, CA (US)

(73) Assignee: HRL Laboratories, LLC, Malibu, CA (US)

( * ) Notice: Subject to any disclaimer, the term of this patent is extended or adjusted under 35 U.S.C. 154(b) by 635 days.

This patent is subject to a terminal disclaimer.

(21) Appl. No.: 14/335,800

(22) Filed: Jul. 18, 2014

Related U.S. Application Data

(60) Provisional application No. 61/913,145, filed on Dec. 6, 2013.

(51) Int. Cl.
*F16M 13/00* (2006.01)
*F16D 7/00* (2006.01)

(52) U.S. Cl.
CPC ..................... *F16D 7/00* (2013.01)

(58) Field of Classification Search
CPC ......... B63B 27/24; F16M 11/08; F16L 3/015; F16D 7/00
USPC ....................... 248/577, 578, 583
See application file for complete search history.

(56) References Cited

U.S. PATENT DOCUMENTS

| 3,032,082 | A | * | 5/1962 | Vilain | B67D 9/02 |
| | | | | | 137/615 |
| 3,924,421 | A | * | 12/1975 | Dehne | F16D 7/00 |
| | | | | | 192/30 W |
| 4,720,084 | A | | 1/1988 | Hollerweger et al. | |
| 5,244,170 | A | * | 9/1993 | Shekher | B64G 1/641 |
| | | | | | 244/118.1 |
| 5,794,909 | A | | 8/1998 | Platus et al. | |
| 6,527,262 | B2 | | 3/2003 | Hagino et al. | |

(Continued)

FOREIGN PATENT DOCUMENTS

| EP | 0487637 B1 | 12/1998 |
| WO | WO 2013/039401 A1 | 3/2013 |
| WO | WO 2013/062406 A1 | 5/2013 |

OTHER PUBLICATIONS

Platus, David L., "Negative-stiffness-mechanism vibration isolation systems," SPIE vol. 1619 Vibration Control in Microelectronics, Optics, and Metrology (1991), pp. 44-54.

(Continued)

*Primary Examiner* — Gwendolyn W Baxter
(74) *Attorney, Agent, or Firm* — Lewis Roca Rothgerber Christie, LLP

(57) ABSTRACT

A variable stiffness structure configured to support a variable load, the variable stiffness structure including a shaft coupled to the variable load, a negative stiffness element, a clutch coupled to the negative stiffness element and configured to disengage and to engage the shaft, in response to a change in the variable load, while the structure supports the variable load.

25 Claims, 16 Drawing Sheets

(56) References Cited

U.S. PATENT DOCUMENTS

| | | | | |
|---|---|---|---|---|
| 6,626,490 | B2* | 9/2003 | Williams | B62J 1/00 297/195.1 |
| 8,087,499 | B1 | 1/2012 | McKnight | |
| 8,899,393 | B2* | 12/2014 | Kraner | G05B 19/404 188/266.7 |
| 2010/0320952 | A1* | 12/2010 | Su | F16D 7/00 318/475 |
| 2010/0327682 | A1* | 12/2010 | Su | F16D 7/04 310/78 |
| 2012/0018269 | A1* | 1/2012 | Yang | F16D 47/04 192/31 |
| 2013/0118098 | A1* | 5/2013 | Constantinou | E04H 9/02 52/167.1 |
| 2013/0233998 | A1* | 9/2013 | Bueter | F16F 7/1005 248/566 |
| 2015/0136937 | A1* | 5/2015 | Xu | F16F 15/02 248/566 |

OTHER PUBLICATIONS

Wang, Y.C., et al., "Extreme stiffness systems due to negative stiffness elements," 2004 American Association of Physics Teachers Am. J. Phys. 72(1), Jan. 2004, pp. 40-50.

Yu, Yunhe, et al., "A literature review of automotive vehicle engine mounting systems," Mechanism and Machine Theory 36 (2001), pp. 123-142.

International Preliminary Report on Patentability for International Application No. PCT/US2014/068670, dated Jun. 16, 2016, 6 pages.

International Search Report and Written Opinion for International Application No. PCT/US2014/068670 dated Aug. 26, 2015, 8 pgs.

Office action for U.S. Appl. No. 14/561,185, dated Jul. 12, 2016, 5 pages.

* cited by examiner

NEGATIVE STIFFNESS SYSTEM WITH VARIABLE PRELOAD ADJUSTMENT

CROSS-REFERENCE TO RELATED APPLICATION

This application claims the benefit of and priority to U.S. Provisional Application No. 61/913,145, filed Dec. 6, 2013, the entire content of which is incorporated herein by reference.

FIELD

The present invention relates generally to the stiffness of non-linear structures and, more particularly, to a clutched negative stiffness systems.

BACKGROUND

Negative stiffness can be generated by non-linear behavior. For instance, simple and widely used non-linear structures that can generate negative stiffness include snap-through beams, buckling beams, over-rotation, and rolling or sliding contact between components. Non-linear structures that exhibit both positive and negative stiffness are potentially useful in a variety of mechanical design applications. For instance, a negative stiffness element (e.g., a buckling-type beam that can exhibit non-linear behavior) can be combined with a positive stiffness element, such as a supporting spring, to provide a structure having zero or quasi-zero stiffness (QZS) over a range of displacements. The quasi-zero stiffness of the structure may be used to isolate another object or mass (e.g. a structure, device, package, and/or an instrument) from unwanted vibrations because the transmission of vibrations through systems of very low stiffness is minimal. However, these conventional isolating structures tend to be unstable in their isolating mode and are more easily utilized for their damping and shock isolation abilities, because manufacturing technologies and techniques are typically not accurate enough to create a QZS structure that does not require frequent tuning. Additionally, conventional QZS structures may not be capable of maintaining low to zero stiffness in the presence of large static load changes (e.g., large static force changes), which may induce a large displacement in the system. One approach is to use a motor to adjust a secondary, softer positive spring in parallel to the main support spring. However, this approach has the limitation of only being able to adjust to small changes in force. Another approach uses a passive negative stiffness system where a large motion would cause the negative stiffness element to disengage and slip in relation to the positive element. However, this system has a disadvantage that it is unable to reset to its minimum stiffness after slippage, which limits its ability to isolate unwanted vibrations.

Accordingly, what is desired is a method of re-centering negative stiffness without completely disengaging the negative stiffness element.

SUMMARY

Aspects of embodiments of the present invention are directed toward a system capable of isolating vibrations while still supporting large static forces.

Aspects of embodiments of the present invention are directed toward various clutched variable stiffness structures and various methods of adjusting for static load changes while isolating unwanted vibrations. According to an embodiment the same motion utilized to increase/decrease negative stiffness is used to adjust the connectivity of the system to some positive stiffness system. According to another embodiment, compression in the one or more negative stiffness elements is maintained while the system is adjusted.

According to embodiments of the present invention, there is provided a
a variable stiffness structure configured to support a variable load, the variable stiffness structure including: a shaft coupled to the variable load; a negative stiffness element; a clutch coupled to the negative stiffness element and configured to disengage and to engage the shaft, in response to a change in the variable load, while the structure supports the variable load.

In one embodiment, the shaft is configured to couple the variable load to an external body, and the negative stiffness element is configured to isolate vibrations of the variable load from the external body.

In one embodiment, the change in the variable load produces a displacement in a relative position of the variable load and the external body exceeding an operational range of displacement within which the negative stiffness element provides a negative stiffness constant to an aggregate stiffness constant of the structure, and, in response to the change in the variable load, the clutch is configured to return to the return the structure to the operational range of displacement by disengaging and engaging the shaft to adjust a relative position of the negative stiffness element with the shaft.

In one embodiment, the structure is configured to maintain a substantially constant stiffness as the clutch disengages and engages the shaft in response to the change in the variable load.

In one embodiment, the substantially constant stiffness is about zero stiffness.

In one embodiment, the structure further includes a positive stiffness element coupled to the shaft and configured to provide a positive stiffness constant to an aggregate stiffness constant of the structure.

In one embodiment, the structure further includes an actuator coupled to the positive stiffness element and configured to adjust a position of the shaft along an isolation direction in response to the change in the variable load, wherein the shaft extends along the isolation direction.

In one embodiment, the negative stiffness element and the positive stiffness element are configured to set an aggregate stiffness of the structure in a range from about 0 to a positive value.

In one embodiment, the clutch is configured to grip the shaft and to couple the negative stiffness element to the shaft when the clutch engages the shaft, and the clutch is configured to release the shaft and to decouple the negative stiffness element from the shaft when the clutch disengages the shaft.

In one embodiment, the clutch is configured to disengage or engage the shaft in response to a compressive force of the negative stiffness element.

In one embodiment, the structure further includes an actuator coupled to the negative stiffness element and configured to adjust a compressive force of the negative stiffness element.

In one embodiment, the shaft is configured to move relative to the clutch to adjust for the change in the variable load when the clutch disengages the shaft.

In one embodiment, the negative stiffness element is a beam configured for snap-through or buckling negative stiffness.

In one embodiment, the negative stiffness element is coupled to one or more actuators at one or both ends of the negative stiffness element.

In one embodiment, the negative stiffness element includes a first negative stiffness element and a second negative stiffness element, the first and second negative stiffness elements being configured to provide a same compressive force in diametrically opposite directions, and the clutch includes a first friction surface coupled to the first negative stiffness element and a second friction surface coupled to the second negative stiffness element, the first and second friction surfaces being configured to engage or disengage the shaft in response to the same compressive force of the first and second negative stiffness elements.

In one embodiment, the negative stiffness element includes a first opposing pair of negative stiffness elements and a second opposing pair of negative stiffness elements, each of the first and second opposing pairs of negative stiffness elements configured to provide a first force and a second force diametrically opposed to and of a same value as the first force, a summation of the first force of the first opposing pair of negative stiffness elements and the first force of the second opposing pair of negative stiffness elements being substantially constant, and the clutch includes a first opposing pair of friction surfaces and a second opposing pair of friction surfaces respectively coupled to the first opposing pair of negative stiffness elements and the second opposing pair of negative stiffness elements and configured to engage or disengage the shaft in response to the first and second forces of the first and the second opposing pairs of negative stiffness elements.

In one embodiment, the clutch includes a first glide block, a second glide block, and a release mechanism, each of the first and second glide blocks having a friction surface and being configured to grip the shaft when the clutch engages the shaft, the release mechanism being configured to separate the first and second glide blocks and to allow the shaft to move between the first and second glide blocks when the clutch disengages the shaft.

In one embodiment, the clutch includes a plurality of cut marks configured to make the clutch compressible, and a passage configured to allow the shaft to move through the passage along a lengthwise direction of the passage when the clutch disengages the shaft and to grip the shaft when the clutch engages the shaft.

In one embodiment, the structure, further includes a round tapered housing and a screw mechanism coupled to and encompassing the round tapered housing, the negative stiffness element includes a plurality of negative stiffness elements coupled to the round tapered housing and the clutch and positioned radially around the shaft, and the screw mechanism is configured to adjust a compressive force of the plurality of negative stiffness elements.

In one embodiment, the shaft includes a permanent magnet, and the clutch includes an electro magnet configured to repel the permanent magnet when the clutch disengages the shaft and to attract the permanent magnet when the clutch engages the shaft.

In one embodiment, the structure further includes a threshold stopper, the shaft includes a plurality of notches, and the clutch includes a pawl and a lever coupled to the pawl, the pawl being configured to disengage and engage the plurality of notches of the shaft, the lever being configured to contact the threshold stopper and to disengage the pawl from the plurality of notches of the shaft in response to the change in the variable load.

In one embodiment, the structure further includes an actuation driver coupled to the clutch and configured to generate a signal in response to the change in the variable load, wherein the clutch includes a plurality of alternating actuator elements configured to excite a bending wave in the clutch in response to the signal generated by the actuation driver and to engage and disengage the clutch to and from the shaft.

According to embodiments of the present invention, there is provided a device including two or more of the variable stiffness structures according to the structure above, wherein the two or more of the variable stiffness structures are arranged in series and/or in parallel.

According to embodiments of the present invention, there is provided an isolation system including: a body; a variable load; and a variable stiffness structure coupled to the body and the variable load and configured to isolate vibrations of the variable load from the body in presence of a change in the variable load, the variable stiffness structure including: a shaft coupled to the variable load and extending along an isolation direction; a positive stiffness element coupled to the shaft and to the body and configured to adjust a position of the shaft along the isolation direction in response to the change in the variable load; a negative stiffness element configured to isolate vibrations of the variable load from the body; and a clutch coupled to the negative stiffness element and configured to disengage and to engage the shaft and to adjust a relative position of shaft with respect to the negative stiffness element, in response to the change in the variable load, while the negative and positive stiffness elements isolates vibrations of the variable load from the body.

In one embodiment, the isolation system further includes an actuator coupled to the negative stiffness element and configured to control a stiffness of the structure.

In one embodiment, the isolation system further includes a sensor coupled to the actuator, wherein the sensor is configured to detect at least one condition of the negative stiffness element, and wherein the actuator is configured to control the stiffness of the negative stiffness element according to the at least one detected condition of the negative stiffness element.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present invention will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

In many mechanical structures, such as structures utilized in transportation systems, it is desirable to isolate wide-band vibrations while being subjected to a wide range of static forces (e.g., g-loads). The present disclosure is directed toward various embodiments of a largely passive system (e.g., a variable stiffness structure) capable of isolating vibrations while still supporting large static forces.

The variable stiffness structures of the present disclosure may be incorporated into any system or device in which it is desirable to prevent or at least reduce the transmission of vibration through the structure or device, such as, for instance, gyroscopes (wherein the accuracy of the gyroscope is proportional to the level of vibration isolation), passenger vehicles (e.g., vibration isolation between the engine and the chassis of the vehicle or between a wheel and the road), aircraft (e.g., vibration isolation between a helicopter blade and a hub of the helicopter), cameras (wherein vibration reduction may improve image quality), radar and other sensitive measurement equipment, precision targeting equipment (e.g., smart munitions targeting systems), sensitive medical equipment, satellites, and/or the like. Transmissibility is a measure of vibration isolation quality and is defined as the ratio of the response amplitude of the isolated system or device to the excitation amplitude input into the system or device (i.e., the excitation amplitude is the force or displacement that the variable stiffness structures of the present disclosure are configured to prevent or at least reduce from being transmitted to a vibration-sensitive structure).

In conventional dynamic systems it is often difficult to account for large variations in static force (e.g., "DC offset" in load). "DC offset" in load refers to any load change where the frequency component of the change is less than ⅕ of the natural frequency of the overall system. Embodiments of the present invention are directed toward an isolator with quasi-zero-stiffness (QZS) stiffness capable of isolating low-amplitude vibrations while allowing large variations in static force.

In some embodiments, low stiffness (e.g., high isolation) is maintained at mid to high frequencies while permitting large loads to pass through the network by utilizing a nearly passive network to reduce (e.g., minimize) the power used by the system. In other embodiments of the present invention are directed toward methods of re-centering negative stiffness without disengaging the negative stiffness element. In further embodiments, "manual" adjustments of the system are provided to accommodate static load offsets that are expected to remain constant for a period of time. Accordingly, embodiments of the present invention achieve wide bandwidth isolation with high static (e.g., "DC") stiffness and reduced (e.g., minimal) applied power.

Figure 1A:
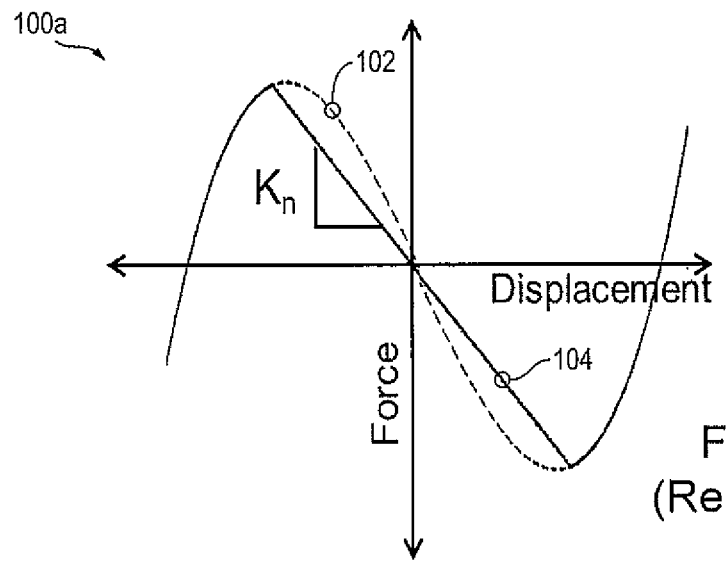
FIG. 1A illustrates, the force-displacement relationship for a generic negative stiffness element.
Figure 1B:
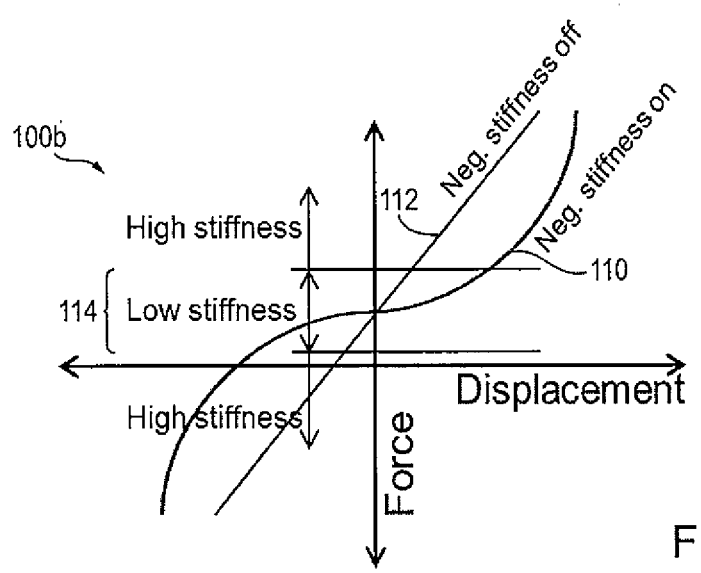
FIG. 1B illustrates a force-displacement relationship for a generic quasi-zero-stiffness (QZS) spring system.

FIG. 1A illustrates a force-displacement relationship 100a for a negative stiffness element. FIG. 1B illustrates the force-displacement relationship 100b for a generic quasi-zero-stiffness (QZS) spring system including a negative stiffness element and positive stiffness element.

Negative stiffness structures are structures that are in some unstable state, for example, in a state of buckling or collapse. Some examples are a buckled beam or an over-center toggle mechanism. Outside a critical displacement, the stiffness of the structure is positive, but within the critical range, stiffness is negative (represented by $K_n$ in FIG. 1A). The negative stiffness may take any shape, but generally lies between a cubic (e.g., the dotted-line curve 102) and linear (e.g., the solid-line curve 104) relationship with respect to displacement, as shown in FIG. 1A. When a negative stiffness structure is coupled in parallel with a positive stiffness structure (e.g., a spring having a linear force-displacement relationship represented by curve 112), the system may stabilize into a nonlinear quasi-zero-stiffness (QZS) system, exhibiting low stiffness within a limited force range 114, and high stiffness outside of that range, as illustrated by curve 110 in FIG. 1B. Such a passive system is useful in applications where the average force stays within the "low stiffness" range, and the relationship between vibration amplitude and frequency is fixed. Examples may include machines or equipment operating on the ground or a fixed surface.

For systems with a changing vibration spectrum or additional environmental loads and accelerations, an adaptive negative stiffness component may be controlled (e.g., adjusted) to assume any stiffness between the positive stiffness spring (e.g., curve 112) and nearly zero stiffness (e.g., near center portion of curve 110). While this may be useful in situations where the static force is small and of limited duration, when the low frequency or quasi-static force is large and more prolonged, the load may operate away from the low stiffness portion of the force displacement curve 110, thus passing more vibration through the network.

Figure 2A:
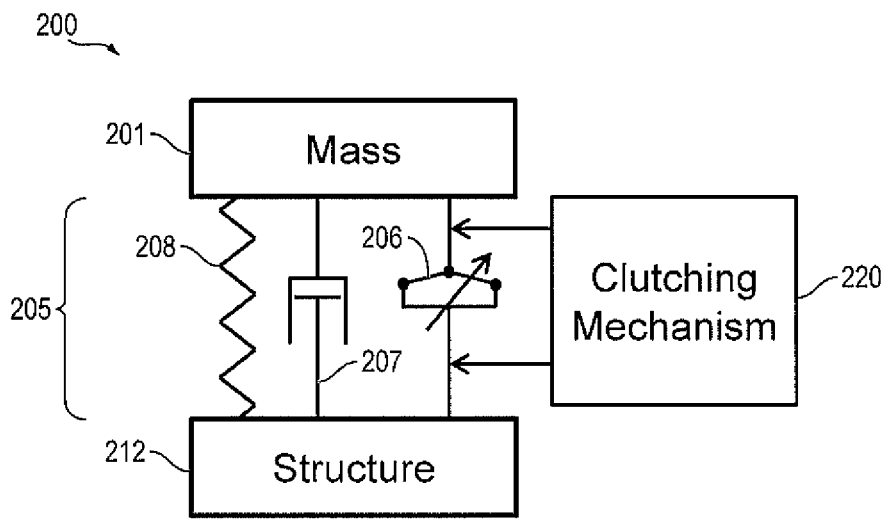
FIGS. 2A and 2B are a functional representation and a schematic diagram, respectively, of an isolation system, according to an illustrative embodiment of the present invention.

FIG. 2A is functional representation of an isolation system (e.g., an adaptive QZS system or negative stiffness clutch system) 200, according to an illustrative embodiment of the present invention. The isolation system 200 includes a mass (e.g., a variable load) 201, a structure 212, and a mount 205 for protecting (e.g., isolating) the mass 201 from the motion of the structure 212 (as may be the case in, e.g., a camera mount), for protecting (e.g., isolating) the structure 212 from a vibrating mass 201, or, in some instances both simultaneously (e.g. in engine mounts). The mount 205 may be represented, in part, as, a damper element 207, and a positive stiffness element (e.g., positive stiffness spring or static stiffness element) 208. The damper element 207 and the positive stiffness (PS) element 208 represent the dissipation and load-supporting properties, respectively, of the mount 205, and may, for example, be a viscous damper and a coil spring, or a solid piece of rubber. The damper element 207 and the positive stiffness element 208 shown in FIG. 2A are those of a simple single-degree of freedom network, which may be translational or torsional. However, embodiments of the present invention are not limited thereto, and the spring and damper combination shown may be replaced with a more complex positive-stiffness system.

In an embodiment, the mount 205 further includes a negative stiffness element (e.g., a variable negative stiffness) 206 and a clutch mechanism (e.g., an integrated friction clutch) 220. Without the clutch mechanism 220, the negative stiffness (NS) element 206 allows the isolation system 200 to exhibit any stiffness between zero and that of the PS element 208, provided that the static force exerted in the mount 205 remains substantially constant (e.g., within the low stiffness range 114 of FIG. 1B). However, according to embodiments of the present invention, in the event of large static force offsets (e.g., offsets that would cause the isolation system 200 to fall out of the low stiffness range 114 of FIG. 1B), the clutch mechanism 220 provides the isolation system 200 with a low-energy mechanism for adjusting the range (in force or displacement) of the NS element 206 to compensate for a static force offset. In FIG. 2A, the NS element 206 is shown as a simple spring pinned at each end. However, the NS element 206 is not limited thereto and may include any complex negative element, such as a Belleville washer, buckling beam or column, higher-mode (2, 3) buckling beam, a multi-link mechanism, and/or the like.

Figure 2B:
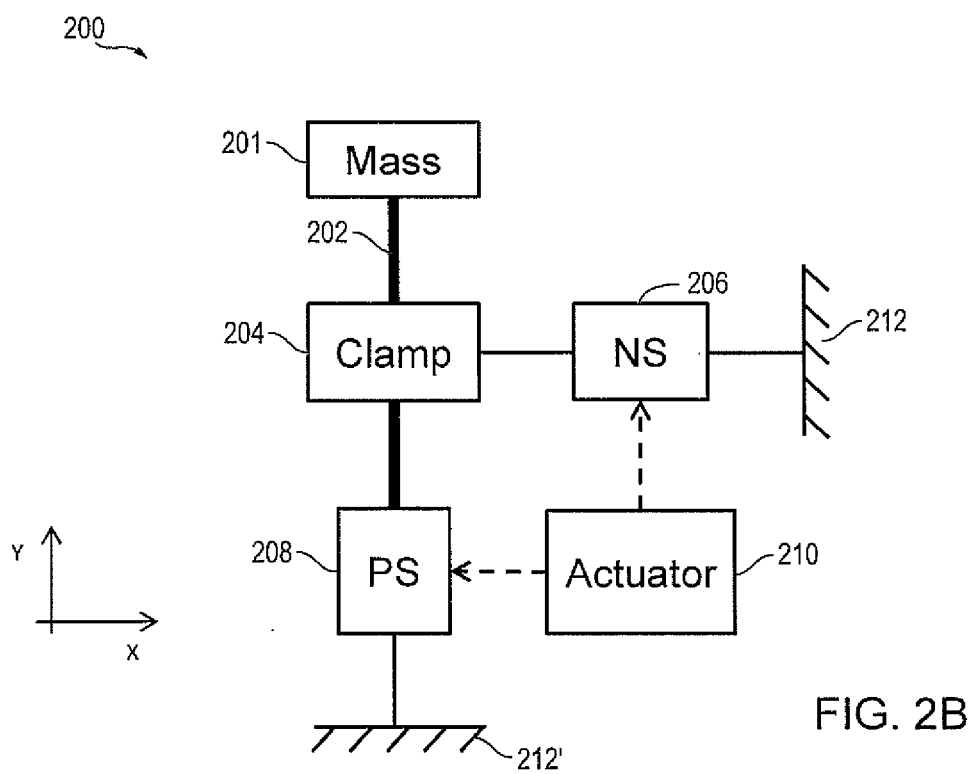

FIG. 2B is schematic diagram illustrating an isolation system 200, according to an illustrative embodiment of the present invention. The isolation system 200 includes a shaft (e.g., central shaft) 202 coupled to a mass (e.g., a variable load) 201, a clutch (e.g., clamp) 204 for gripping the shaft 202, a negative stiffness (NS) element (e.g., NS spring) 206 for coupling the shaft 202 to a structure 212 through the clutch 204, a positive stiffness (PS) element 208 for supporting the mass 201 and shaft 202 combination and coupling it to the structure 212' (which may be the same as or coupled to the structure 212), and an actuation system 210 including one or more actuators operatively coupled to the NS elements 206 and/or the PS element 208. The actuation system 210 controls the stiffness of one or more of the stiffness elements (i.e., the NS and PS elements 206 and 208) and/or position of the one or more of the stiffness elements relative to the structure 212/212'.

According to an embodiment, when the isolation system 200 is "on" (e.g., when the clutch 204 engages the shaft 202 and the system 200 is in QZS mode isolating unwanted vibrations) the high amount of force (e.g., compressive force) present in the NS element 206 also serves to hold the NS element 206 in place relative to the structure 212 and/or mass 201; and when the isolation system is "off" (e.g., when the clutch 204 disengages the shaft 202 and the system 200 operates in high stiffness mode) the compressive force is small, and the NS element 206 is free to move (e.g., slide or glide) relative to the structure 212 and/or mass 201. Accordingly, the isolation system 200 may provide fully variable stiffness and static adjustment to isolate the mass 201 and/or structure 212/212' from unwanted vibrations. Further, the isolation system 200 may be protected from large-amplitude load variations (e.g., mass variations), even during clutch action, as the PS element 208 is never disengaged.

Figure 3A:
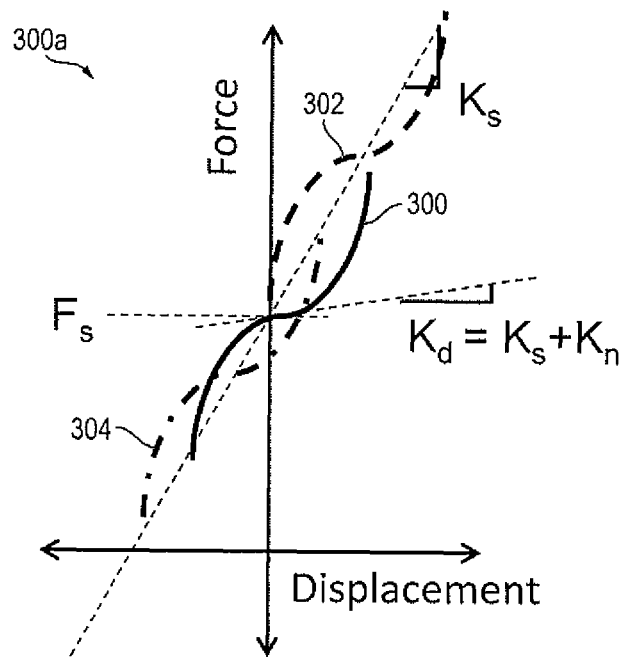
FIGS. 3A and 3B illustrate the concept of re-adjusting the connectivity of a negative stiffness element in an adaptive quasi-zero-stiffness (QZS) system to maintain the low-stiffness region at a current static force, according to illustrative embodiments of the present invention.
Figure 3B:
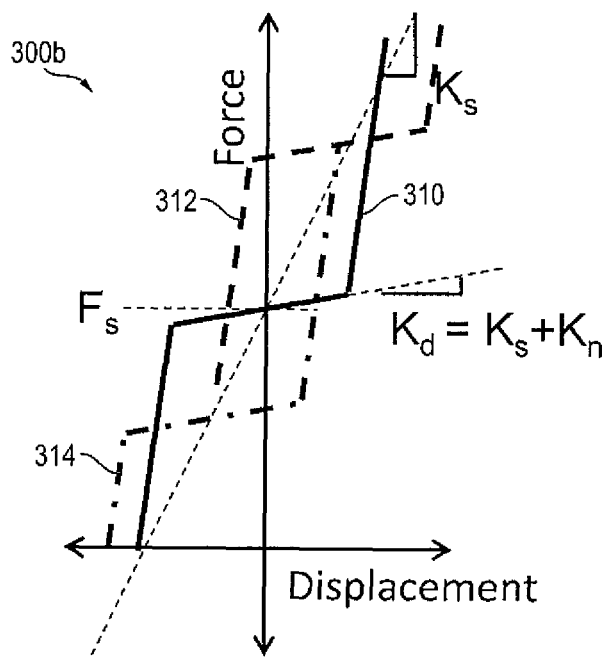

FIGS. 3A and 3B illustrate the concept of re-adjusting the connectivity of a negative stiffness element in an adaptive quasi-zero-stiffness (QZS) system to maintain the low-stiffness region at a current static force, according to illustrative embodiments of the present invention. FIG. 3A illustrates the force-displacement relationship of an adaptive QZS system having a cubic negative stiffness element (such as shown by curve 102 of FIG. 1A), according to an illustrative embodiment of the present invention. FIG. 3B illustrates the force-displacement relationship of an adaptive QZS system having a linear negative stiffness element (such as shown by curve 104 of FIG. 1B), according to an illustrative embodiment of the present invention.

In FIGS. 3A and 3B, curves 300a and 300b represent the baseline force-displacement relationship of the adaptive QZS system, according to embodiments of the present invention. The effective (or aggregate) low stiffness is given by $K_d$ that is the sum of the static stiffness $K_s$ (which stabilizes the system and supports the static load, $F_s$) and negative stiffness $K_n$ over the range of displacement where the negative element provides a negative stiffness constant. When the static force $F_s$ changes (e.g., due to additional mass or inertial loads effects), the adaptive QZS system alters the relative position between negative and positive stiffness springs to adjust the region of low stiffness to match a new value of $F_s$. Curves 302, 304, 312, and 314 represent examples of other force-displacement relationships that the adaptive QZS system may assume by changing the relative displacement of the negative and positive elements of the system. As shown in FIGS. 3A and 3B, the adjustment creates a system with high effective static stiffness for variable low frequency loads, and simultaneously or concurrently low dynamic stiffness for higher frequency vibratory loads.

Figure 4A:
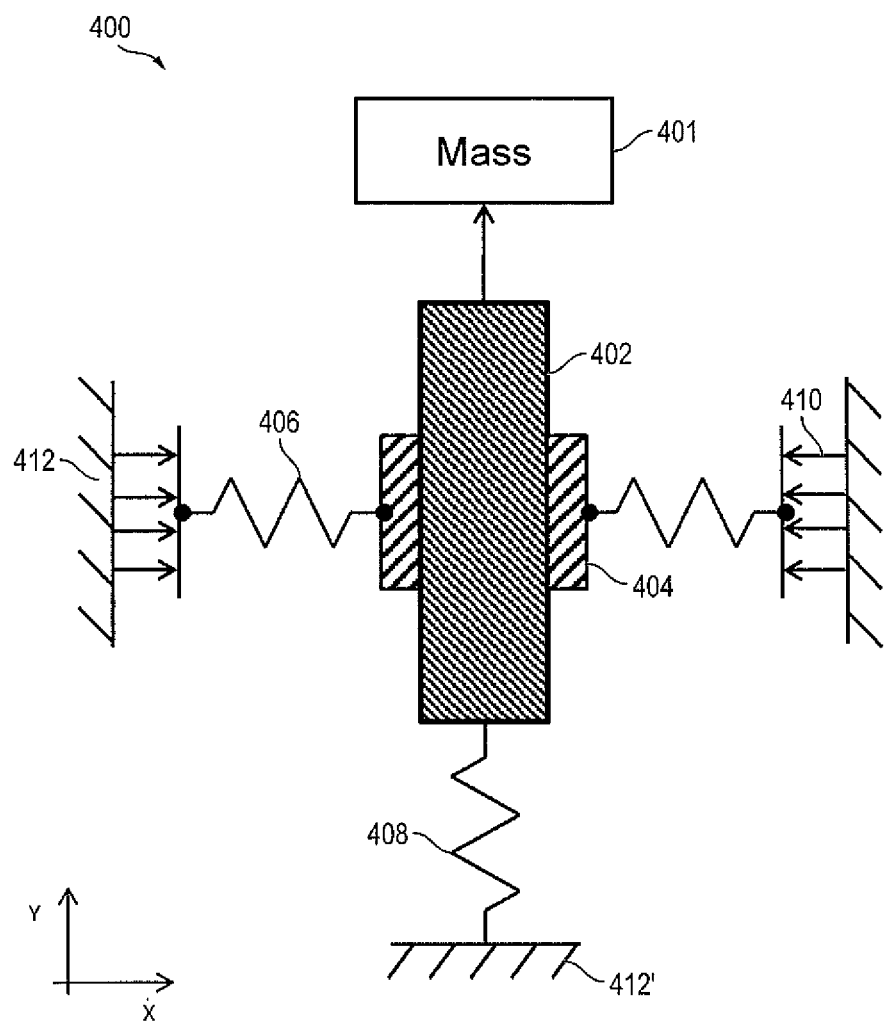
FIGS. 4A-4E are schematic diagrams of a simple translational negative stiffness (NS) clutch system, according to an illustrative embodiment of the present invention.
Figure 4B:
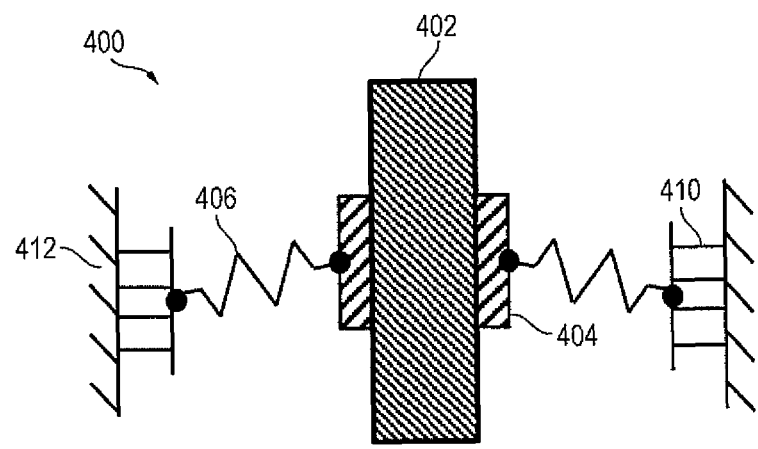
Figure 4C:
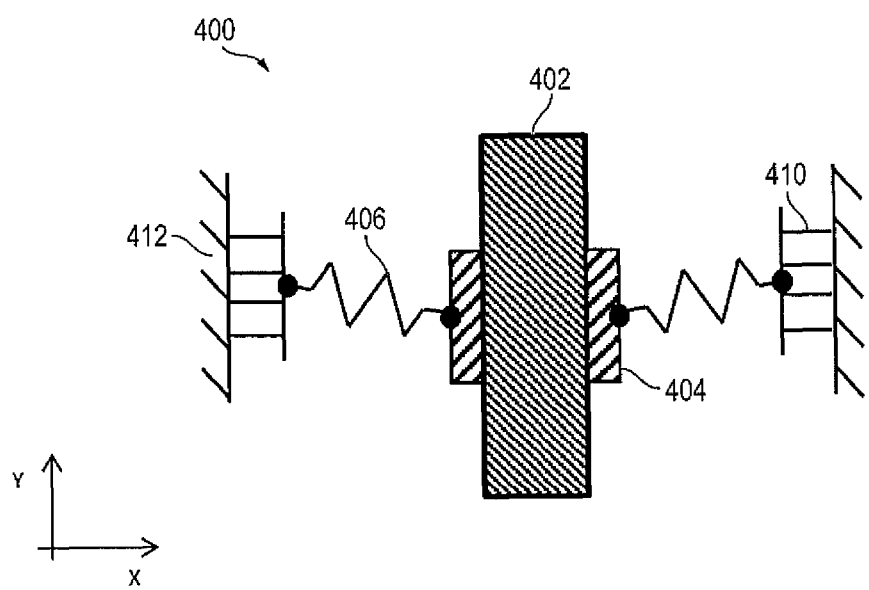
Figure 4D:
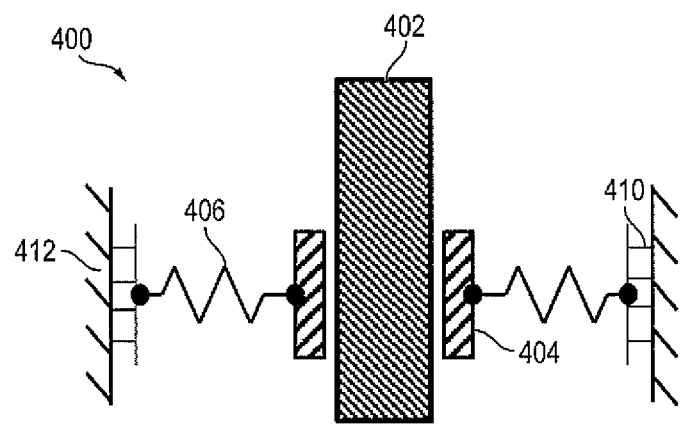
Figure 4E:
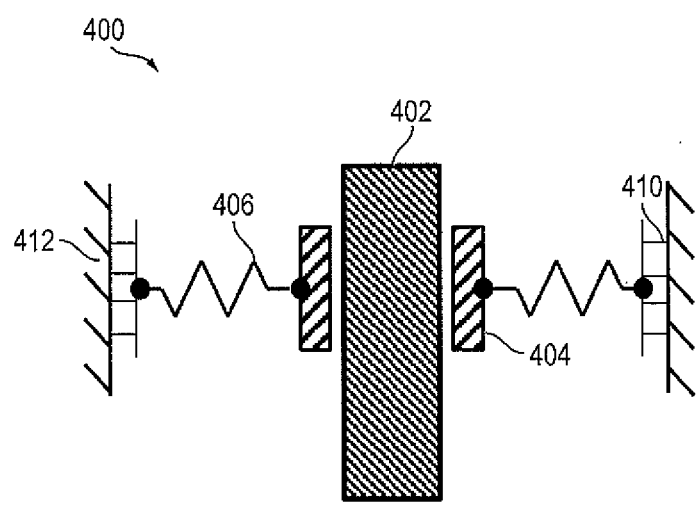

FIGS. 4A-4E are schematic diagrams of a simple translational negative stiffness (NS) clutch system 400, according to an illustrative embodiment of the present invention. FIGS. 4A-4C illustrate the translational NS clutch system 400 in an "on" position, according to an embodiment of the present invention. FIGS. 4D and 4E illustrate the translational NS clutch system 400 in an "off" position, according to an embodiment of the present invention.

Referring to FIGS. 4A-4E, the translational NS clutch system 400 includes a shaft (e.g., central shaft) 402 coupled to a mass (e.g., a variable load) 401, a clutch (e.g., clamp) 404 including pair of gripping surfaces (e.g., friction surfaces) for gripping the central shaft 402, a pair of NS elements (e.g., NS springs) 406 for coupling the central shaft 402 to a structure 412 through the clutch 404 (e.g., friction surfaces), two or more actuators 410 operatively coupled to the NS elements 404, and a positive stiffness element 408 for supporting the mass 401. The actuators 410 are configured to be actuated between a plurality of different positions to control the stiffness of the NS elements 406. In particular, as the actuators 410 expand along the x-direction and apply a force (e.g., compressive force) to the NS element 406, the negative stiffness of the NS elements 406 increase. As the actuators 410 contract along the x-direction and reduce the compressive force on the negative stiffness elements 406, the negative stiffness of the NS elements 406 decrease. In FIGS. 4A-4E, the y-direction represents the isolation direction (e.g., the vibration isolation direction) and the x-direction represents a direction transverse to the isolation direction.

In FIG. 4A, the NS elements 408 are shown in the "on" position, with the actuators 410 compressing the NS elements 408 so that they have negative stiffness in the horizontal direction (e.g., in the x-direction). According to an embodiment, in the "on" position, the compressive force of the actuators 410 is greater than the vertical force passing through the NS clutch system 400, so that the NS elements 406 may easily grip the central shaft (e.g., the smooth central shaft) 402. In one example, the amount of compressive force is at least five times greater than the vertical force. The friction surface 404 may include any wear-resistant material, such as graphite, polymers, soft metals, and/or the like.

FIGS. 4B and 4C illustrate the translational NS clutch system 400 in its two limit positions, up and down.

According to an embodiment, in the "off" position, the actuators 410 have retracted so that compression in the NS elements 406 is low (e.g., zero), and the mass 401 moves freely in relation to the structure 412/412', as shown in FIGS. 4D and 4E.

When the NS clutch system 400 is re-engaged, the friction surfaces 404 may grip the central shaft 402 at a new position, with the low-stiffness region now centered about the new static force level.

Figure 5:
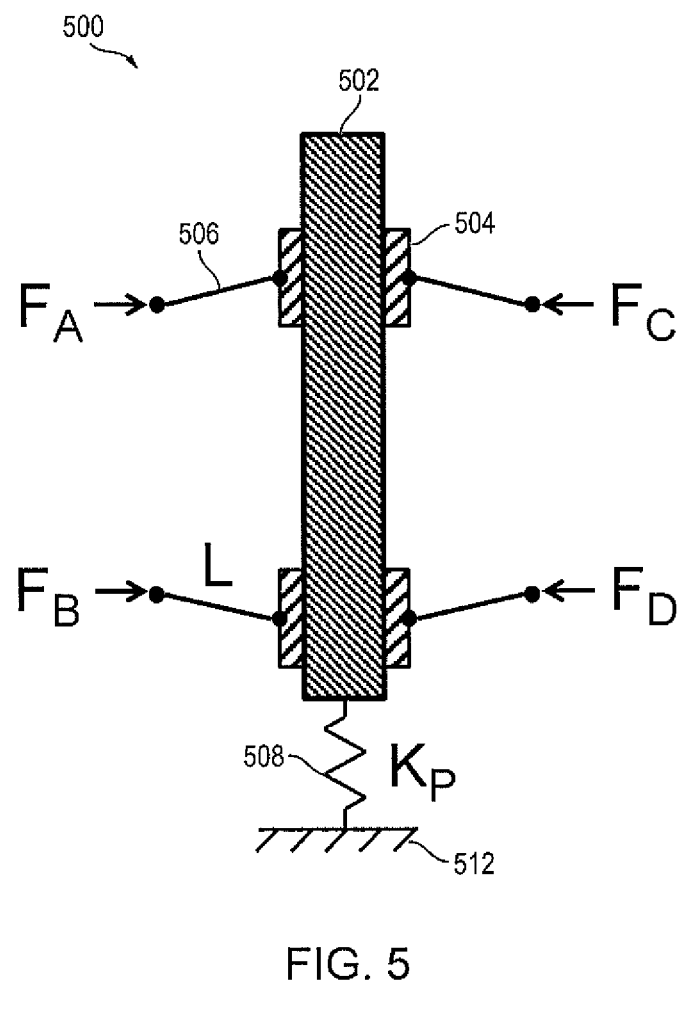
FIG. 5 is a schematic diagram of a NS clutch system including a network of clutched negative stiffness structures providing (nearly) continuous isolation, according to an illustrative embodiment of the present invention.

FIG. 5 is a schematic diagram of a NS clutch system 500 including a network of clutched negative stiffness structures providing (nearly) continuous isolation, according to an illustrative embodiment of the present invention.

In an embodiment, the NS clutch system 500 includes two or more clutches (e.g., clamps) 504 to provide a nearly constant stiffness during static load changes. In an example (e.g., as shown in FIG. 5), a network of two negative stiffness structures (e.g., two pairs of friction surfaces 504 and NS elements 506), each with a controllable force (e.g., forces $F_A$, $F_B$, $F_C$, and $F_D$, which may be individually controlled) behind them support a central shaft 502. Each of the forces $F_A$-$F_D$ may be individually controlled to turn on or off by the compression of a spring or by action of one or more actuators. In one embodiment, equilibrium is maintained by applying equal forces $F_A$ and $F_C$, and equal forces $F_B$ and $F_D$. The overall stiffness of the system is therefore determined by the following expression:

$$K_{total} = -(2 \times F_A + 2 \times F_B)/L + K_p \qquad (1)$$

wherein L is the length of each of the NS elements 506 and $K_p$ is the stiffness of the static spring element (e.g., positive stiffness spring) 508. Forces $F_A$ and $F_B$ (e.g., the actuator motion behind the boundary condition) may be coordinated so that the overall system stiffness is constant, even when there one of forces $F_A$-$F_D$ is zero, allowing the one of the clutches (e.g., clutches or friction surfaces) 504 to release and the central shaft to move (e.g., slide or glide) relative to the structure 512. For example, any change in force $F_A$ may be balanced by an opposite force $F_B$. In another example, smooth engagement/disengagement may be accomplished by maintaining the summation of forces $F_A$ and $F_B$ constant, while also maintaining the summation of forces $F_C$ and $F_D$ constant. As the number of clutched NS elements in the network grows, performance (e.g., smooth stiffness change and/or low off-axis vibration) may increase at the expense of complexity.

Figure 6A:
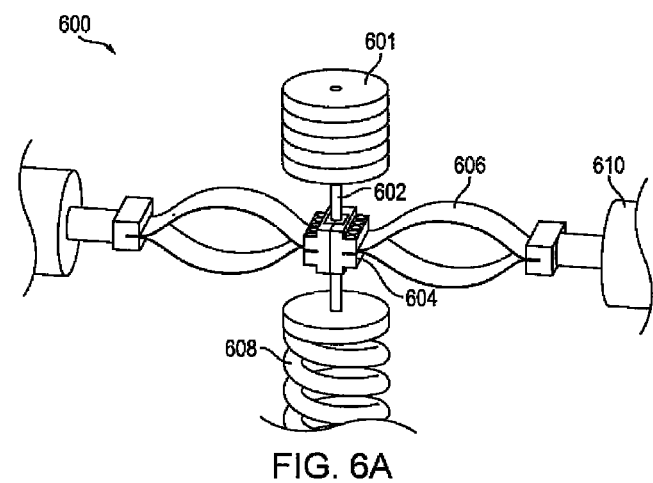
FIGS. 6A and 6B are perspective views of a translational NS clutch system, according to an illustrative embodiment of the present invention.
Figure 6B:
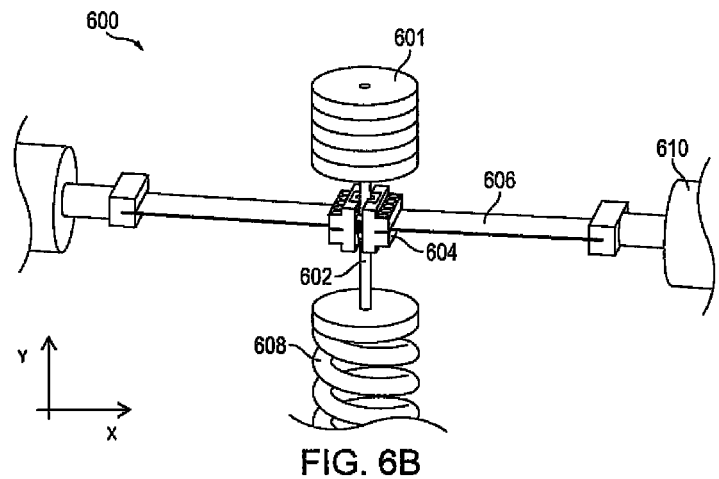

FIGS. 6A and 6B are perspective views of a translational clutch negative stiffness (NS) system 600, according to an illustrative embodiment of the present invention. FIG. 6A illustrates the translational NS clutch system 600 in its closed state (e.g., on or engaged state), and FIG. 6B illustrates the translational NS clutch system 600 in its open state (e.g., off or disengaged state).

In an embodiment, the translational NS clutch system 600 includes a central shaft 602 coupled to (e.g., attached to) a mass (e.g., a variable load) 601, a positive stiffness (PS) element (e.g., a PS spring) 608 for coupling the mass 601 to a structure, a pair of negative stiffness elements 606 each coupled on one end to an actuator 610 and on another end to a central clutch 604. In an embodiment, the negative stiffness element 606 may include a set of beams (e.g., double beams) that, when the system 600 is in a closed state, are held in a buckled shape by utilizing the actuators 610. In an example, the NS elements 606 may be orthogonal to the isolating direction (e.g., the NS elements 606 may be in the x-direction, while the isolating direction is in the y-direction, as shown in FIGS. 6A and 6B). While FIG. 6A illustrates the buckled beams 606 in their 1st mode (e.g., exhibiting a simple bow or single "hump"), other modes of buckling (e.g., higher modes of buckling with higher number of bows) may be possible. The actuators 610 are utilized to both supply loads to the NS elements 606 to place them in tension and induce buckling as well as to disengage the force applied to the central load path (e.g., the central shaft 602).

Figure 6C:
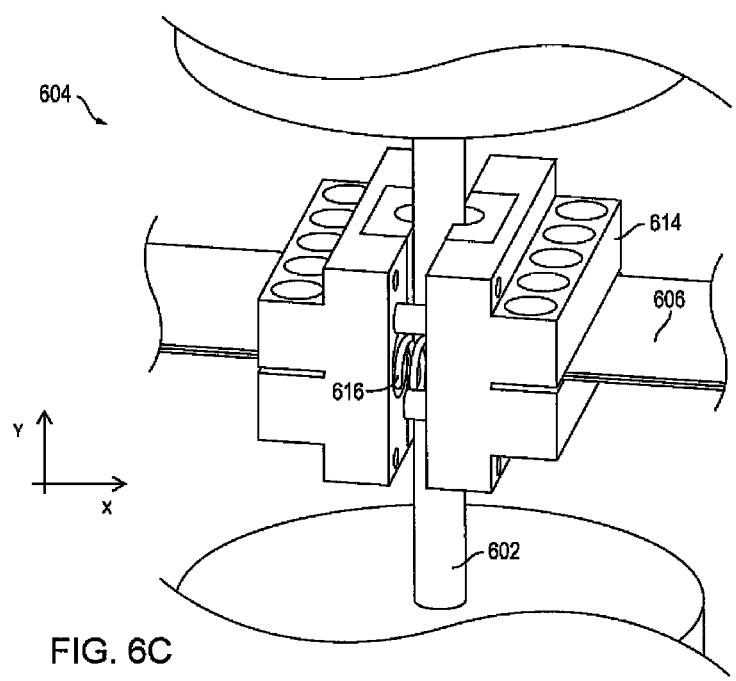
FIG. 6C illustrates a detailed view of the clutch of FIGS. 6A and 6B when the translational NS clutch system is in the open state, according to an illustrative embodiment of the present invention.

FIG. 6C illustrates a detailed view of the clutch (e.g., clamp) 604 of FIGS. 6A and 6B when the translational NS clutch system 600 is in the open state, according to an illustrative embodiment of the present invention. The clutch 604 may include glide blocks 614 for allowing the central shaft 602 to move (e.g., to glide) in the isolating direction (e.g., the y-direction), and a release mechanism (e.g., a release spring) 616 to assist with the release of the clutch 604 when the NS elements 606 are disengaged, as shown in FIGS. 6B and 6C.

In an embodiment, the release mechanism 616 is a coiled compression spring; however, the same clutch release effect may be achieved with a rubber block, an integrated flexure, a small secondary actuator, or the like.

Figure 6D:
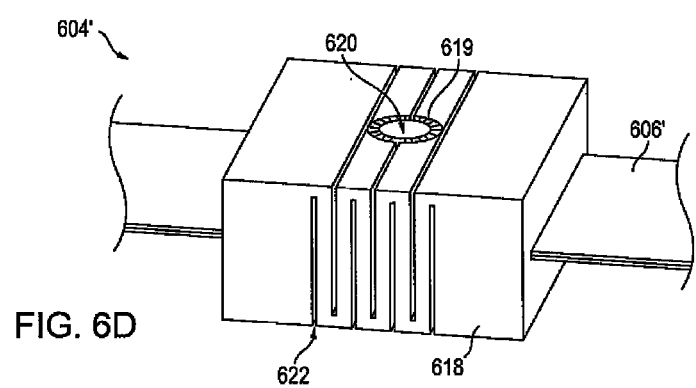
FIG. 6D is a schematic diagram of a clutch including an integrated flexure, according to another illustrative embodiment of the present invention.

FIG. 6D is a schematic diagram of a clutch (e.g., clamp) 604' including an integrated flexure 618, according to another illustrative embodiment of the present invention. In an embodiment, the integrated flexure 618 includes a passage (e.g., through hole) 620 for allowing the central shaft 602 to move in the isolation direction (e.g., in the lengthwise direction of the passage 620, i.e., in the y-direction), and a series of cut marks 622 to make the integrated flexure 618 compressible. The passage 620 and the cut marks 622 may be formed through a machining process. The inner surface of the passage 620 may form a friction surface 619 that grips the central shaft 602 when the clutch 604 is engaged. The inherent elasticity of the integrated flexure 618 material may assist in releasing the central shaft 602 from the friction surface 619 when the clutch 604' disengages the central shaft 602. The integrated flexure material may include any structural material, such as, steel, aluminum, titanium, fiberglass, silicon, or the like.

Figure 7A:
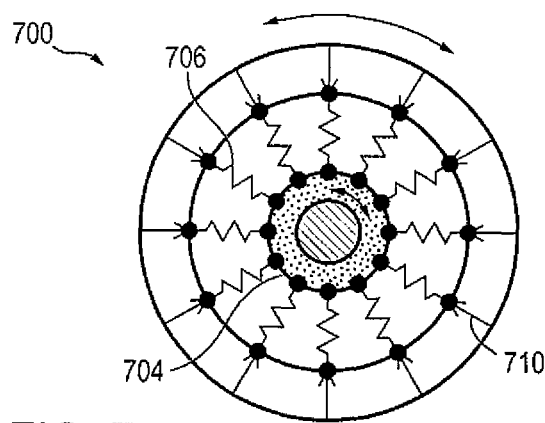
FIGS. 7A-7C are schematic diagrams of a torsional negative stiffness (NS) clutch system, according to an illustrative embodiment of the present invention.
Figure 7B:
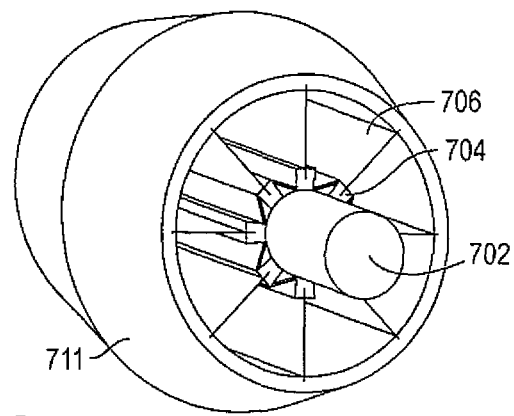
Figure 7C:
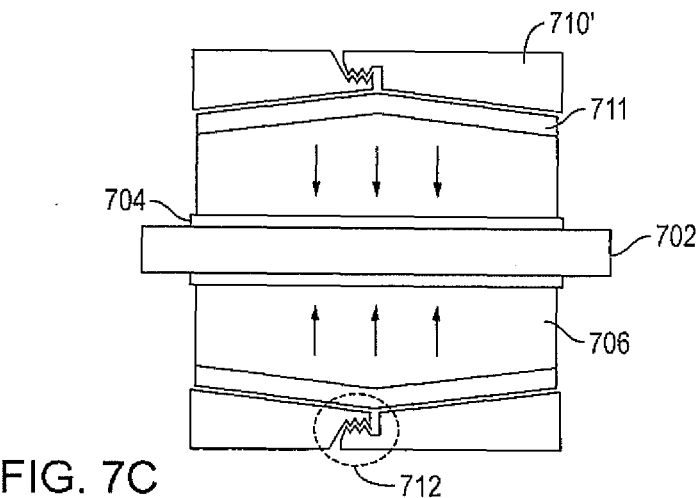

FIGS. 7A-7C are schematic diagrams of a torsional negative stiffness (NS) clutch system (e.g., device) 700, according to an illustrative embodiment of the present invention. FIGS. 7A and 7B are a functional representation and a perspective view of the torsional NS clutch system 700, according to an illustrative embodiment of the present invention; and FIG. 7C is a side view of the torsional NS clutch system 700 illustrating a form of actuation, according to an illustrative embodiment of the present invention.

In an embodiment, the structure is coupled to (e.g., attached to) the outer casing 711 of the device 700 and the mass (e.g., a variable load) is coupled to the central shaft 702. The negative stiffness elements (e.g., springs) 706 are positioned (e.g., arranged) radially around the central shaft 702 and are compressed by an actuator 710, such as a hydraulic piston, electric motor, or the like. When clutch 700 is in an "off" state (e.g., in a disengaged state), there is no compression in the NS elements 706 allowing the clutch (e.g., the friction surface or flexible clamp/clutch) 704 to expand, and the central shaft (as well as the mass coupled to it) to rotate freely. When the clutch 700 is in an "on" state (e.g., engaged state), the compressed NS elements 706 add negative stiffness, and the clutch (e.g., friction surface) 704 is engaged to couple the movement of the central shaft 702 (e.g., rotation of the central shaft 702 around its primary axis) to the rotation of the outer casing 711 and the NS elements 706.

In FIG. 7A, the negative stiffness elements 706 are represented as pinned springs, however, they may be substituted with clamped/pinned beams or other suitable unstable mechanisms. In FIG. 713, the negative stiffness elements 706 include NS elements and are pressed into a flexible clutch 704, which may alternately grip or move (e.g., glide) along the central shaft 702.

When the actuator 710 applies compression to the NS elements 706, the NS elements 706 add negative stiffness and the clutch 700 grips the central shaft 702.

As shown in FIG. 7C, in one embodiment, compression may be achieved by a screw mechanism (e.g., a collet) 710' encompassing and acting on the outer casing (e.g., a doubly-tapered housing) 711. By loosening or tightening the screw mechanism 710', the tension in the NS elements 706 may be adjusted. In an example, the doubly-tapered housing 711 may be manufactured with screw threads 712 to accommodate circumferential stress (e.g., hoop compression). In an example, as one side of the screw mechanism 710' is rotated by a motor, the doubly-tapered housing 711 is compressed, thus increasing stiffness of the NS elements 706. In other embodiments, the external compression may be applied via cables, hose clamps, or the like.

Figure 8:
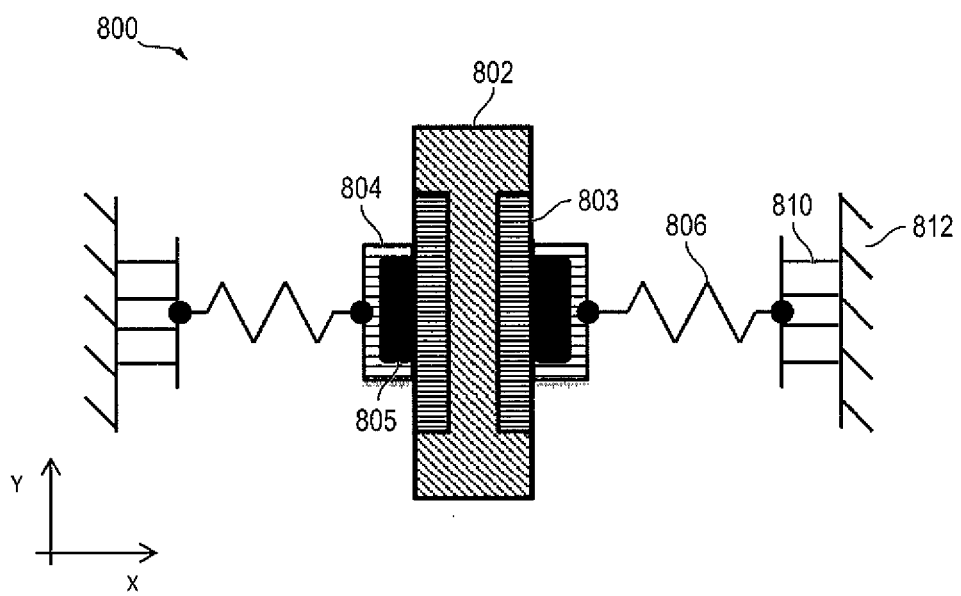
FIG. 8 is a schematic diagram of a magnetic translational NS clutch system, according to an illustrative embodiment of the present invention.

FIG. 8 is a schematic diagram of a magnetic translational NS clutch system 800, according to an illustrative embodiment of the present invention. The magnetic translational NS clutch 800 utilizes a combination of permanent magnets and electromagnets to achieve a clutching mechanism.

According to an embodiment, the central shaft 802 includes permanent magnets 803, and the magnetic clutch (e.g., the magnetic clamp) 804 include ferromagnetic material and electromagnets 805 affixed thereto. The ferromagnetic material of the clutch 804 and the permanent magnet have opposite polarities. Thus, in a state where no static load offset is detected (e.g., the static load is constant), the ferromagnetic material is attracted to the permanent magnets 803, thus, "locking" the system (e.g., engaging the system). In an embodiment, the permanent magnets 803 may be patterned to create discrete locked positions along the length of the central shaft 802. When a static load offset is detected, the electromagnets 805 are energized to create a repulsive force between the permanent magnets 803 and the electromagnets 805, thus, "unlocking" the system (e.g., disengaging the NS element 806) and allowing the central shaft 802 to move in the y direction and compensate for the static load offset. After adjusting for the static load offset, the electromagnets 805 are de-energized to allow the system to "lock" in the new configuration. According to an embodiment, the magnetic translational NS clutch system 800 operates without actuators 810 and the NS elements 806 may be rigidly coupled to the structure 812 on one end.

Generally, it may not be possible to fully disengage the NS element from the PS element (e.g., positive spring) while the NS element is compressed, because this would remove the stabilizing effect of the PS element and the NS element may snap through to a stable (and, e.g., unwanted) position. However, a number of embodiments of the present invention provide limited slippage between negative and positive springs and allow adjustment resulting from static load offsets without losing stability. These embodiments include, for example, a ratchet-pawl mechanism for NS position adjustment in a clutch, and ultrasonic control of friction constant in a clutch.

Figure 9:
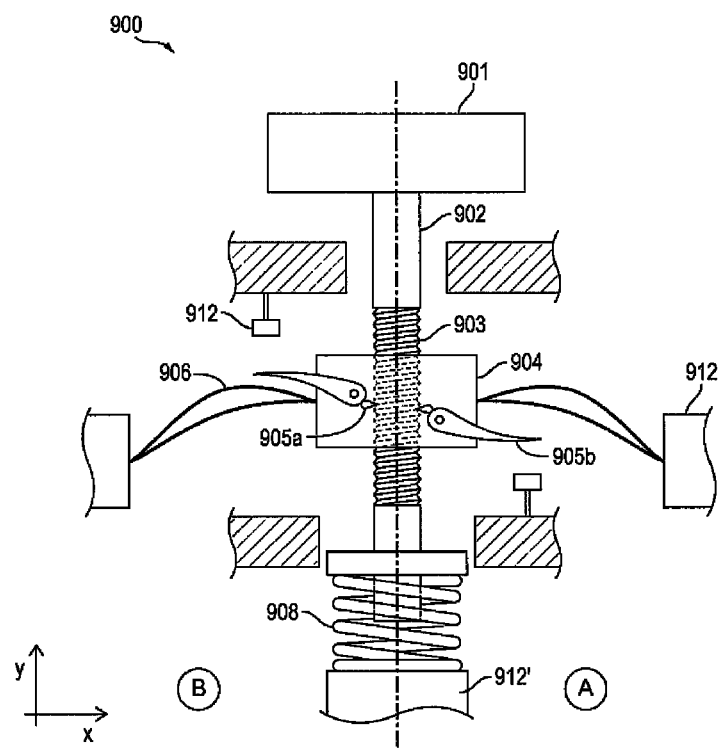
FIG. 9 is a schematic diagram of NS clutch system including a ratchet-pawl mechanism, according to an illustrative embodiment of the present invention.

FIG. 9 is a schematic diagram of a NS clutch system 900 including a ratchet-pawl mechanism, according to an illustrative embodiment of the present invention. The central shaft 902 couples a mass (e.g., a variable load) 901 with a structure 912' via a PS element (e.g., a positive spring) 908, which supports the weight of the mass 901. In an embodiment, the central shaft 902 has a linear rack with teeth (e.g., notches) 903, which engage a pair of pawls 905a, each attached to a lever 905b. The pawl-and-lever pairs are coupled to the clutch (e.g., ratchet clamp) 904, which is coupled to the NS elements (e.g., NS beams) 906. When the there is a static load offset (e.g., when the mass 901) is increased, the NS elements 906 fall out of an isolating configuration until a first lever 905b (shown on side A of FIG. 9) contacts a threshold stopper 912. At this point, the first lever 905b disengages a first pawl 905a from the notches 903 and forces the ratchet clamp 904 (and the NS elements 906) up one notch on the central shaft 902. The ratchet clamp 904 may continue to move further up the central shaft 902, until the PS element 908 and mass 901 combination reaches a new equilibrium point. If there is a static load offset in the opposite direction (e.g., if the mass is decreased), the reverse may occur with a second pawl and lever 905a and 905b (shown on side B of FIG. 9) moving the ratchet clamp 904 down the central shaft 902 until the PS element 908 reaches a new equilibrium length.

In some embodiments, the NS clutch system 900 includes force or rate-based mechanisms for varying the number or size of each step based on how hard and/or how fast the threshold stopper 912 is contacted by the second lever 905b when the central shaft 902 moves in the isolation direction (e.g., along the direction of the central shaft 902).

According to an embodiment of the present invention, the ratchet-pawl mechanism described above may be replaced with an active friction clutch, such as a piezo-electric clutch utilizing "ultrasonic lubrication".

Figure 10A:
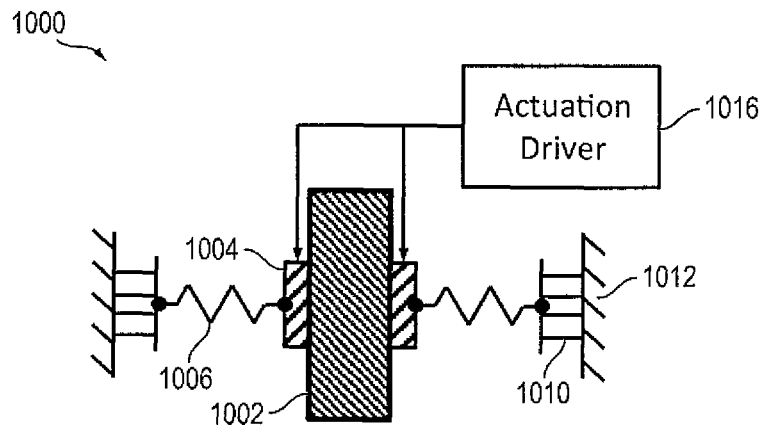
FIG. 10A is a schematic diagram of a NS clutch system utilizing ultrasonic "lubrication" to enable disengagement of the clutch and the central shaft, according to an illustrative embodiment of the present invention.
Figure 10B:
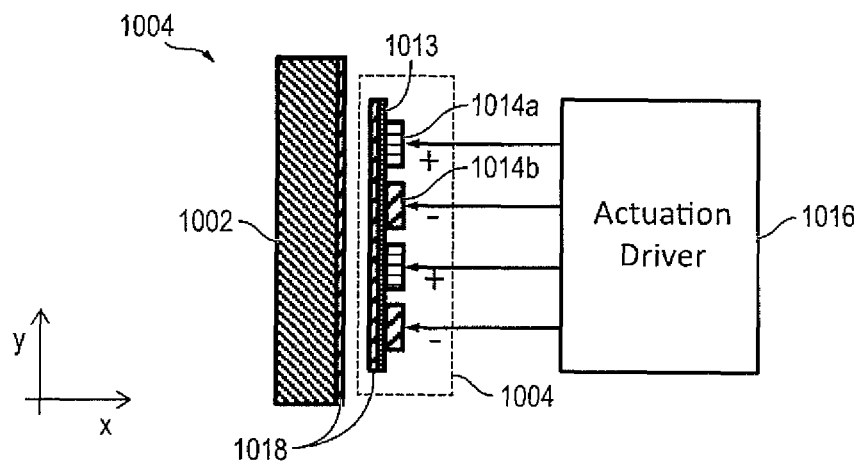
FIG. 10B is a detailed view of the clutch including actuating elements, according to an illustrative embodiment of the present invention.
Figure 10C:
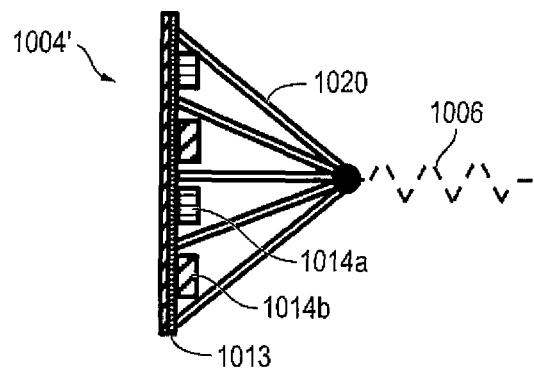
FIG. 10C is a detailed view of the clutch including loading spread elements for concentrating the frictional loads into the axis of the negative stiffness element, according to an illustrative embodiment of the present invention.

FIG. 10A is a schematic diagram of a NS clutch system 1000 utilizing ultrasonic "lubrication" to enable disengagement of the clutch (e.g., friction element) 1004 and the central shaft 1002, according to an illustrative embodiment of the present invention. FIG. 10B is a detailed view of the friction element 1004 including actuating elements 1014a/1014b, according to an illustrative embodiment of the present invention. FIG. 10C is a detailed view of the friction element 1004' including loading spread elements 1020 for concentrating the frictional loads into the axis of the NS element 1006, according to an illustrative embodiment of the present invention.

The clutch 1004 couples the central shaft 1002 to the structure 1012 through the NS element 1006 and the actuator 1010. In an embodiment, the clutch (e.g., the active friction block) 1004 is an active multi-component assembly including a thin plate 1013, an actuation driver (e.g., piezoelectric driver) 1016 and a number of actuator elements (e.g., alternating piezoelectric elements or similar solid state actuator material, such as magnetostrictive elements) 1014a/1014b positioned (e.g., arranged) on the thin plate 1013 in an orientation and spatial location as to excite a bending wave (e.g., a high order bending wave) in the clutch 1004, and an actuation driver (e.g., piezoelectric driver) 1016 for driving the actuator elements 1014a/1014b. The connectivity of the NS element 1006 may be adjusted (e.g., adjusted in a controlled manner) through the application of ultrasonic frequencies to the thin plate 1013. The effective change in stiffness relies on a rapid and wave-motion-based change to the effective friction constant in the material of the thin plate 1013. For example, the actuation driver 1016 may operate at a specific frequency to resonate the clutch (e.g., the friction element) 1004 to enable slipping of the central shaft 1002 through the clutch 1004. The stiffness and thickness of the block may be chosen (e.g., tailored) such that the vibration mode occurs anywhere from several hundred hertz up to ultrasonic frequencies (e.g., about 20 kHz to about 50 kHz). At ultrasonic frequencies the changes in friction may be substantially silent to a human ear.

In an embodiment, by modulating the power delivered to the actuator elements 1014a/1014b using a control circuit (e.g., a frequency and amplitude control circuit), the effective friction constant may be changes by a factor of three or more, thus, allowing any changes in static load (e.g., DC load) to shift (e.g., move or slide) the central shaft 1002 to a new stable position when engaged, and then to lock the central shaft 1002 in position to isolate dynamic loads (e.g., AC loads). As a result, embodiments of the present invention permit rapid changes in friction/engagement of the clutch 1004 (and the NS element 1006), and prevent the removing of the NS element 1006 during static load offset adjustments. Accordingly, embodiments of the present invention may be utilized in complex systems where the NS elements may be altered, as well as simple quasi zero stiffness (QZS) systems where the negative stiffness value is approximately constant.

In an embodiment, as shown in FIG. 10B, the facing sides of the central shaft 1002 and the thin plate 1013 may be covered by a wear coating 1018 to prevent the wearing of the thin plate 1013 and/or the outer surface of the central shaft 1002.

According to an embodiment of the present invention, the friction element 1004 includes a number of load spread elements 1020 that couple the thin plate 1013 to the NS element 1006 and concentrate the diffuse frictional loads on thin plate 1013 into the axis of the negative element 1006.

In an embodiment, the series of load spread elements 1020 may be substituted with an intermediate stiffness material forming in a triangular or conical shape designed to collect/spread the frictional loads.

Figure 11:
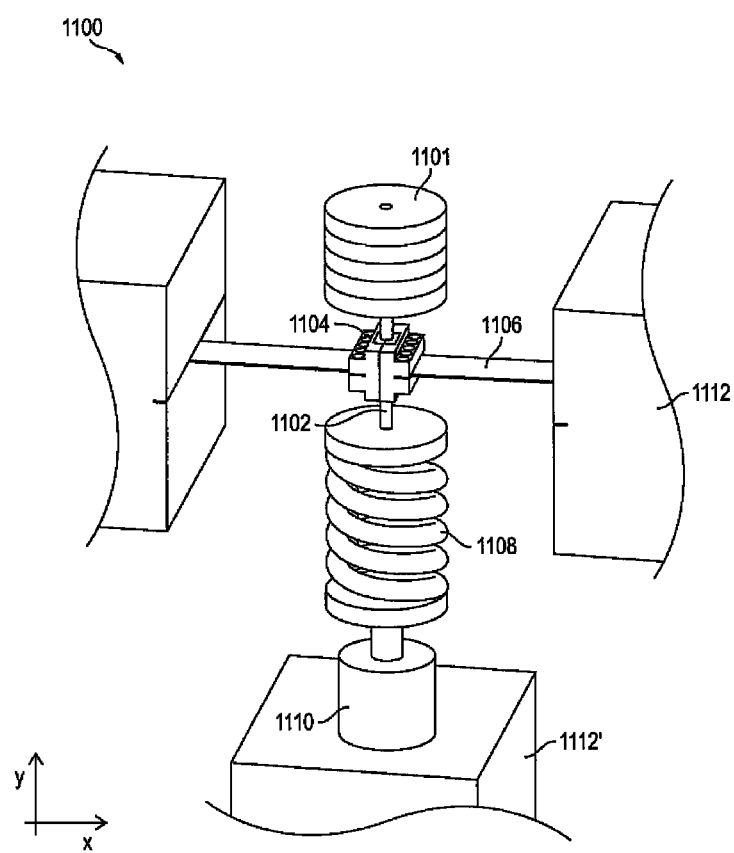
FIG. 11 illustrates a perspective view of a translational NS clutch system performing variable preload adjustment by actuating the positive stiffness element, according to an illustrative embodiment of the present invention.

FIG. 11 illustrates a perspective view of a translational NS clutch system 1100 performing variable preload adjustment by actuating the positive stiffness (PS) element 1108, according to an illustrative embodiment of the present invention.

In an embodiment, rather than disengage/engage the clutch 1104 in response to a static load offset (e.g., a change in the mass 1101), the translational NS clutch system 1100 utilizes an actuator 1110 to adjust the stiffness of the positive stiffness element (e.g., PS spring) 1108 by, e.g., compressing/decompressing the PS element 1108 along the isolation direction (e.g., the y-direction). The actuator 1110 may be operatively coupled between a structure 1112' and the PS element 1108, or may be operatively coupled between the PS element 1108 and the central shaft 1102. However, embodiments of the present invention are not limited thereto, and the actuator 1110 may be coupled, at any point along the isolation direction, between the mass 1101 and the structure 1112. In an embodiment, the clutch 1104 is fixed in position relative to the central shaft 1102 and does not engage/disengage the central shaft 1102 in the manner described above with respect to other embodiments. Accordingly, no actuator 1110 may be utilized to adjust the stiffness of the NS elements 1106, and the NS elements 1106 may be coupled to (e.g., affixed to) a structure 1112 (e.g., mechanically grounded to a rigid host structure), without an actuator 1110 therebetween.

Figure 12:
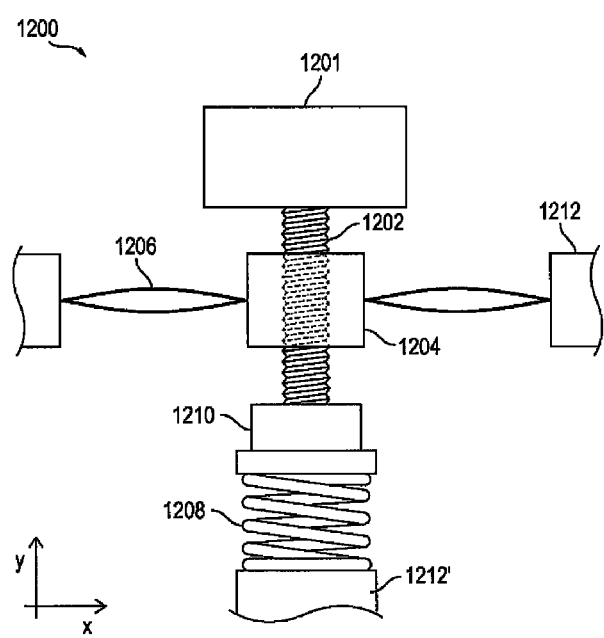
FIG. 12 illustrates a schematic diagram of a translational NS clutch system performing load adjustment by adjusting the length of the central shaft, according to an illustrative embodiment of the present invention.

FIG. 12 illustrates a schematic diagram of a translational NS clutch system 1200 performing load adjustment by adjusting the length of the central shaft 1202, according to an illustrative embodiment of the present invention.

In an embodiment, rather than disengage/engage the clutch 1204 in response to a static load change (e.g., a change in the mass 1201), the translational NS clutch system 1200 utilizes a motor 1210 to adjust the length of the central shaft 1202 according to the change in the static load. For example, if the static load increases (e.g., suddenly increases) the motor 1210 may reduce the length of the central shaft 1202 in proportion to the static load offset. Likewise, if the static load decreases (e.g., suddenly decreases), the motor 1210 may increase the length of the central shaft 1202 in proportion to the static load offset. The motor 1210 may be operatively coupled between a structure 1212' and the positive stiffness element 1208, or may be operatively coupled between the positive stiffness element 1208 and the central shaft 1202. However, embodiments of the present invention are not limited thereto, and the motor 1210 may be coupled, at any suitable point along the isolation direction (e.g., the y-direction), between the mass 1201 and the structure 1212'. In an embodiment, the clutch 1204 is fixed in position relative to the central shaft 1202 and does not engage/disengage the central shaft 1202 in the manner described above with respect to other embodiments. Accordingly, no motor (e.g., actuator) may be utilized to adjust the stiffness of the NS elements 1206, and the NS elements 1206 may be coupled to (e.g., affixed to) a structure (e.g., ground) 1212, without a motor therebetween.

Accordingly, an aspect of the embodiments illustrated in FIGS. 11 and 12 is that adjusting for static load offsets does not require de-tuning (e.g., disengaging) the negative stiffness elements 1106/1206.

Figure 13:
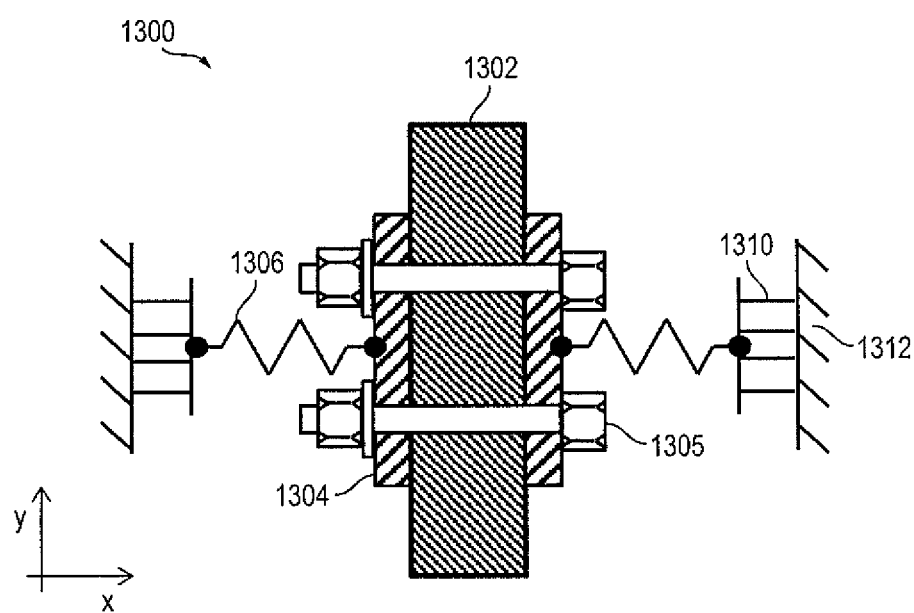
FIG. 13 is a schematic diagram of a NS clutch system utilizing manual adjustment in response to a load change, according to an illustrative embodiment of the present invention.

FIG. 13 is a schematic diagram of a NS clutch system 1300 utilizing manual adjustment in response to a static or DC load change, according to an illustrative embodiment of the present invention.

In an embodiment of the present invention, manual locking of the clutch 1304 may be utilized when the load is not expected to change dynamically (e.g., not expected to change for a long period of time). For example, during an initial set-up, the central shaft 1302 and the clutch (e.g., friction elements) 1304 may be locked (e.g., fastened) in relative position using a fastening mechanism (e.g., nut and bolts or the like) 1305. When the load is expected to change, the fastening mechanism 1305 may be loosened to permit the adjustment of the relative position of the central shaft 1302 and the clutch 1304 (e.g., the central shaft 1302 may be able move up or down in the y-direction, i.e., the lengthwise direction of the central shaft 1302, relative to the clutch 1304), and then retightened to lock the system 1300 in the new configuration.

While in the embodiments described above (e.g., embodiments illustrated in FIGS. 6A-6C, 9, 11, and 12), the negative stiffness element is a snap through beam (e.g., a buckling-type beam), in one or more alternate embodiments, the negative stiffness element may any other suitable kind of structure exhibiting negative stiffness.

Suitable materials for the negative stiffness element, the positive stiffness element, and the actuator depend on a variety of factors, including, the particular application of the NS clutch system, the desired size of the NS clutch system, and the desired mechanical properties of the NS clutch system (e.g., a high strength to elastic modulus ratio, high elastic strain, low creep, low damping, and/or long fatigue life). In one or more embodiments, suitable materials for the negative stiffness element, the positive stiffness element, and the actuator include: metal alloys (e.g. Fe and/or Al), metallic glasses, composite materials (e.g., fiberglass and/or carbon fiber-based polymer composites), engineering plastics, and combinations thereof. For instance, in an embodiment in which the NS clutch system is configured to isolate a vehicle's suspension, the NS element and the PS element may be made out of steel. In an embodiment in which the NS clutch system is configured to isolate a computer chip from unwanted vibrations, the NS element and the PS element may be made out of a piezoelectric material and/or silicon. The NS element and/or the PS element may also be made out of an active material, such as, for instance, thermal expansion materials, shape memory alloys, piezoelectric materials, or electro-active polymers. Additionally, in embodiments in which the NS element and/or the PS element are made out of an active material, the NS element and/or the PS element may function as the actuator such that the actuator is not a separate component. For instance, if the negative stiffness element is made out of a material with high thermal expansivity, an electric current may be passed through the NS element that may resistively heat the NS element and cause it to selectively expand and contract, thereby decreasing and increasing, respectively, the negative stiffness of the NS element in the same or similar manner as a separate actuator. In one or more alternate embodiments, the NS element and/or the PS element may comprise electrostatic forces rather than a structure component made out of a particular material. Additionally, in or more embodiments, the PS element may have structural and environmental properties similar to the NS element (e.g., being made of a same structural material via similar manufacturing processes, such as laser-cut spring steel), which may provide advantages in manufacturing cost and device complexity, although in one or more alternate embodiments, the NS element and the PS element may be made out of dissimilar materials.

Although in the various embodiments illustrated in FIGS. 4A-4E, 5, 6A-6D, 8, 9, 10A-10C, 11 and 12, the NS clutch systems include actuators located at one end of the stiffness elements (e.g., negative and/or positive stiffness elements), in alternate embodiments, the NS clutch systems may include any other suitable number of actuators located at any other suitable positions relative to the stiffness elements, such as, for instance, actuators located at another end of the stiffness elements or a pair of actuators located at opposite ends of each of the stiffness elements. Additionally, in some embodiments, the NS clutch system may include a first actuator that is a different kind of actuator from a second actuator (e.g., the first actuator may have a different frequency response or displacement range than the second actuator). In some embodiment in which the NS clutch systems includes a plurality of actuators, at least one of the actuators may be configured to control at least one of the other actuators.

The NS clutch system of the present disclosure may include any suitable kinds of actuators, such as, active materials (e.g., piezoelectric materials, shape memory alloys, magnetostrictive materials, electro-active polymers, and dielectric elastomers), servo motors, stepper motors, solenoids, ultrasonic drives, voice coils, hydraulics, wedges, levers, tapered shafts, and/or the like.

In an embodiment, the selection of a suitable actuator may be based on a desired level of precision and/or speed for controlling the amount of negative stiffness of the NS clutch system. In some embodiments, a combination of actuators may be used in order to obtain a desired level of precision and/or speed for controlling the amount of negative stiffness, particularly when a single kind of actuator is not suitable to provide the desired level of both precision and speed. For example, a piezoelectric material may provide a relatively fine adjustment, but over a relatively limited range. As a further example, a linear motor may provide adjustment over a relatively large range, but provides a relatively course adjustment. Various other actuators identifiable by a skilled person may be used, alone or combination with other actuators (of a same or a different kind), in order to control an amount of negative stiffness in a system.

According to some embodiments of the present invention, one or more sensors are configured to measure or detect one or more conditions of the NS clutch system, such as, for instance, a position of the isolated mass (e.g., mass 201, 901, 1101, or 1201), a position of the one or more stiffness elements (e.g., NS and/or PS elements), strain on the one or more stiffness elements, the temperature of the NS clutch system, and/or the like. Additionally, the one or more sensors may be configured to detect and/or measure one or more conditions of the structure or system into which the NS clutch system is integrated. For instance, in an embodiment in which the NS clutch system is incorporated in a vehicle, the one or more sensors may be configured to collect external information such as, engine revolutions per minute (RPMs), velocity, braking, steering inputs and/or the like. The one or more sensors may be any kind of sensors suitable for detecting and/or measuring the relevant conditions of the NS clutch system, such as, position sensors (e.g., linear variable differential transformer (LVDT) sensors, optical sensors, and/or laser-based sensors), strain sensors, load cells (e.g., strain gauges in a Wheatstone bridge configuration) to provide load information for the one or more stiffness elements (e.g., NS and/or PS elements), a temperature sensor to compensate for thermal effects, and/or the like. The one or more sensors may be configured to send one or more signals to a control system, which drives the actuators to expand or contract based upon the one or more input signals from the one or more sensors.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to or "connected" to another component, it can be directly attached to the other component or intervening components may be present therebetween.

What is claimed is:

1. A variable stiffness structure configured to support a variable load, the variable stiffness structure comprising:
   a shaft coupled to the variable load;
   a negative stiffness element; and
   a clutch coupled to the negative stiffness element and configured to disengage and to engage the shaft, in response to a change in the variable load, while the structure supports the variable load.

2. The structure according to claim 1,
   wherein the shaft is configured to couple the variable load to an external body, and
   wherein the negative stiffness element is configured to isolate vibrations of the variable load from the external body.

3. The structure according to claim 2,
   wherein the change in the variable load produces a displacement in a relative position of the variable load and the external body exceeding an operational range of displacement within which the negative stiffness element provides a negative stiffness constant to an aggregate stiffness constant of the structure, and
   wherein, in response to the change in the variable load, the clutch is configured to return the structure to the operational range of displacement by disengaging and engaging the shaft to adjust a relative position of the negative stiffness element with the shaft.

4. The structure according to claim 1, wherein the structure is configured to maintain a substantially constant stiffness as the clutch disengages and engages the shaft in response to the change in the variable load.

5. The structure according to claim 4, wherein the substantially constant stiffness is about zero stiffness.

6. The structure according to claim 1, further comprising a positive stiffness element coupled to the shaft and configured to provide a positive stiffness constant to an aggregate stiffness constant of the structure.

7. The structure according to claim 6, further comprising an actuator coupled to the positive stiffness element and configured to adjust a position of the shaft along an isolation direction in response to the change in the variable load,
   wherein the shaft extends along the isolation direction.

8. The structure according to claim 6, wherein the negative stiffness element and the positive stiffness element are configured to set an aggregate stiffness of the structure in a range from about 0 to a positive value.

9. The structure according to claim 1,
   wherein the clutch is configured to grip the shaft and to couple the negative stiffness element to the shaft when the clutch engages the shaft, and
   wherein the clutch is configured to release the shaft and to decouple the negative stiffness element from the shaft when the clutch disengages the shaft.

10. The structure according to claim 1, wherein the clutch is configured to disengage or engage the shaft in response to a compressive force of the negative stiffness element.

11. The structure according to claim 1, further comprising an actuator coupled to the negative stiffness element and configured to adjust a compressive force of the negative stiffness element.

12. The structure according to claim 1, wherein the shaft is configured to move relative to the clutch to adjust for the change in the variable load when the clutch disengages the shaft.

13. The structure according to claim 1, wherein the negative stiffness element is a beam configured for snap-through or buckling negative stiffness.

14. The structure according to claim 1, wherein the negative stiffness element is coupled to one or more actuators at one or both ends of the negative stiffness element.

15. The structure according to claim 1,
   wherein the negative stiffness element comprises a first negative stiffness element and a second negative stiffness element, the first and second negative stiffness elements being configured to provide a same compressive force in diametrically opposite directions, and
   wherein the clutch comprises a first friction surface coupled to the first negative stiffness element and a second friction surface coupled to the second negative stiffness element, the first and second friction surfaces being configured to engage or disengage the shaft in response to the same compressive force of the first and second negative stiffness elements.

16. The structure according to claim 1,
   wherein the negative stiffness element comprises a first opposing pair of negative stiffness elements and a second opposing pair of negative stiffness elements, each of the first and second opposing pairs of negative stiffness elements configured to provide a first force and a second force diametrically opposed to and of a same value as the first force, a summation of the first force of the first opposing pair of negative stiffness elements and the first force of the second opposing pair of negative stiffness elements being substantially constant, and
   wherein the clutch comprises a first opposing pair of friction surfaces and a second opposing pair of friction surfaces respectively coupled to the first opposing pair of negative stiffness elements and the second opposing pair of negative stiffness elements and configured to engage or disengage the shaft in response to the first and second forces of the first and the second opposing pairs of negative stiffness elements.

17. The structure according to claim 1, wherein the clutch comprises a first glide block, a second glide block, and a release mechanism, each of the first and second glide blocks having a friction surface and being configured to grip the shaft when the clutch engages the shaft, the release mechanism being configured to separate the first and second glide blocks and to allow the shaft to move between the first and second glide blocks when the clutch disengages the shaft.

18. The structure according to claim 1, wherein the clutch comprises a plurality of cut marks configured to make the clutch compressible, and a passage configured to allow the shaft to move through the passage along a lengthwise direction of the passage when the clutch disengages the shaft and to grip the shaft when the clutch engages the shaft.

19. The structure according to claim 1, further comprising a round tapered housing and a screw mechanism coupled to and encompassing the round tapered housing,
wherein the negative stiffness element comprises a plurality of negative stiffness elements coupled to the round tapered housing and the clutch and positioned radially around the shaft, and
wherein the screw mechanism is configured to adjust a compressive force of the plurality of negative stiffness elements.

20. The structure according to claim 1,
wherein the shaft comprises a permanent magnet, and
wherein the clutch comprises an electro magnet configured to repel the permanent magnet when the clutch disengages the shaft and to attract the permanent magnet when the clutch engages the shaft.

21. The structure according to claim 1, further comprising a threshold stopper,
wherein the shaft comprises a plurality of notches, and
wherein the clutch comprises a pawl and a lever coupled to the pawl, the pawl being configured to disengage and engage the plurality of notches of the shaft, the lever being configured to contact the threshold stopper and to disengage the pawl from the plurality of notches of the shaft in response to the change in the variable load.

22. The structure according to claim 1, further comprising an actuation driver coupled to the clutch and configured to generate a signal in response to the change in the variable load,
wherein the clutch comprises a plurality of alternating actuator elements configured to excite a bending wave in the clutch in response to the signal generated by the actuation driver and to engage and disengage the clutch to and from the shaft.

23. An isolation system comprising:
a variable load; and
a variable stiffness structure coupled to an external body and the variable load and configured to isolate vibrations of the variable load from the external body, the variable stiffness structure comprising:
a shaft coupled to the variable load and extending along an isolation direction;
a positive stiffness element coupled to the shaft and to the external body and configured to adjust a position of the shaft along the isolation direction in response to a change in the variable load;
a negative stiffness element configured to isolate vibrations of the variable load from the external body; and
a clutch coupled to the negative stiffness element and configured to disengage and to engage the shaft and to adjust a relative position of shaft with respect to the negative stiffness element, in response to the change in the variable load, while the negative and positive stiffness elements isolates vibrations of the variable load from the external body.

24. The isolation system according to claim 23, further comprising an actuator coupled to the negative stiffness element and configured to control a stiffness of the structure.

25. The isolation system according to claim 24, further comprising a sensor coupled to the actuator,
wherein the sensor is configured to detect at least one condition of the negative stiffness element, and
wherein the actuator is configured to control the stiffness of the negative stiffness element according to the detected at least one condition of the negative stiffness element.

* * * * *